US005421682A

United States Patent [19]

Obermeier et al.

[11] Patent Number: 5,421,682

[45] Date of Patent: Jun. 6, 1995

[54] TOOL BIT CHUCKING SHANK

[75] Inventors: Josef Obermeier, Peiting, Germany; Michael Selb, Feldkirch, Austria

[73] Assignee: Hilti Aktiengesellschaft, Schaan, Liechtenstein

[21] Appl. No.: 216,579

[22] Filed: Mar. 22, 1994

[30] Foreign Application Priority Data

Apr. 26, 1993 [DE] Germany ........................ 43 13 580.3

[51] Int. Cl.[6] ............................................... B23B 51/02

[52] U.S. Cl. .................................... 408/226; 279/19.3; 279/75; 408/239 R

[58] Field of Search ................................. 279/19–19.5, 279/75, 904, 905; 408/226, 239 R

[56] References Cited

U.S. PATENT DOCUMENTS 4,943,192 7/1990 Lafforgue et al. .................... 279/19
5,028,057 7/1991 Wanner .............................. 279/19.3
5,076,371 12/1991 Obermeier et al. ................ 279/19.3
5,174,698 12/1992 Obermeier ......................... 279/19.3
5,286,145 2/1994 Kleine ................................ 279/19.4
5,320,459 6/1994 Kleine ................................ 279/19.3
5,324,145 6/1994 Kleine ................................ 279/19.3
5,346,340 9/1994 Runge ................................ 279/19.3

*Primary Examiner*—Steven C. Bishop
*Attorney, Agent, or Firm*—Anderson Kill Olick & Oshinsky

[57] ABSTRACT

A tool bit, to be inserted into a tool bit chuck of a hand-held tool used for at least one of chiseling, drilling and percussion drilling, has an axially extending chucking shank (10) with a polygon-like cross-section having chamfered corners (13, 14, 15, 16). The chucking shank has two profiled faces disposed diametrically opposite one another and each has a locking groove (19) closed at its axially spaced ends. Two other diametrically opposite profiled faces form entrainment faces (12) with rotary entrainment grooves (11) each having entrainment faces (17, 18) for transmitting torque to the tool bit.

14 Claims, 7 Drawing Sheets

TOOL BIT CHUCKING SHANK

BACKGROUND OF THE INVENTION

The present invention is directed to a tool bit to be inserted into a tool bit chuck of a hand-held tool used for at least one of chiseling, drilling and percussion drilling with a chucking shank having at least one axially extending locking groove closed at its axially spaced ends and at least one entrainment surface having a non-circular contour with the entrainment surface open at a free end of the chucking shank.

In a tool bit shank for a drill as described above and disclosed in DE-PS 25 51 125 there is a groove closed at its axially spaced end and having a semicircular cross-section. The spaced ends of the groove are shaped as hollow spheres and a spherically-shaped locking member engages in the groove and the locking member is guided for radial displacement in a tool bit chuck. The axial movement of the chucking shank in a tool bit chuck is limited by the locking member.

The tool bit shank has rotary entrainment grooves with entrainment faces open in the axial direction at the free end of the chucking shank. These entrainment faces cooperate with a strip or lug-shaped rotary entrainment member in the tool bit shank. The strip-shaped rotary entrainment member is fixed in the tool bit shank. In a tool bit with a small working diameter and a relatively overly large chucking shank diameter, it is necessary to effect a considerable material deformation or machining in the region of the chucking shank involving considerable expense. Such fabrication is uneconomical and cost intensive.

SUMMARY OF THE INVENTION

Therefore, the primary object of the present invention is to provide a chucking shank for a tool bit so that the formation of the chucking shank can be carried out economically on a tool bit with a small working diameter.

In accordance with the present invention, the chucking shank is shaped with a polygon-like cross-section with chamfered corners and profiled surfaces extending between the corners, whereby the guidance contour of the chucking shank is formed by the corner surfaces of at least two corners and by arranging at least one entrainment face in the region of one profiled surface.

Additional entrainment faces are formed by using a chucking shank with a polygon-like cross-section where the faces or surfaces of the shank serve for transmitting the torque. Wear in the region of the chucking shank is clearly reduced, since the contact area between the chucking shank and the tool bit chuck is increased in the region of the entrainment face. Furthermore, the formation of tool bits having small working diameters is more economical, since less material has to be deformed in the region of the chucking shank.

The corners located at the periphery of the shank between the profiled surfaces or faces serve for centering the chucking shank in the tool bit chuck. The corners are chamfered or rounded and thus form a radial guidance contour.

With a circular receiving bore in the tool bit chuck, the guidance surface is preferably formed by at least two corners located diametrically opposite one another. In place of only two corners, three corners of a so-called three-point support can be used, if the corners are located on the same diameter and spaced 120° apart.

To provide the guidance of the chucking shank in the tool bit chuck with a minimum of wear, the guidance surface is preferably formed by four corners, wherein each pair of corners are disposed diametrically opposite one another.

The larger the number of corners, the smaller is the radially applied loading at an individual corner.

Preferably at least two entrainment faces are provided on the chucking shank. A more uniform centered torque transmittal is attained by an arrangement of a second or more entrainment faces.

At least a portion of the entrainment faces at the basically radially extending region of rotary entrainment grooves are open in the axial direction at the free end of the chucking shank. To obtain an improved torque transmittal from the tool bit chuck to the chucking shank, the entrainment faces formed by the profiled surfaces include radial recesses which afford an enlargement of the entrainment faces or surfaces.

Entrainment grooves with flanks on the entrainment side extending essentially radially have been found to be especially advantageous. Such flanks form a direct engagement face for the transmittal of torque effective in the circumferential direction.

Depending on the cross-sectional shape of the tool bit shank, the polygon-like profile of the chucking shank is expediently configured as a four-cornered polygon. Primarily, the cross-section of such a clamping shank can be square or rectangular. With a square chucking shank, all of its faces are essentially of the same size. With a rectangular shank the profile faces have different sizes. If the locking groove is located in the region of a smaller face, then the larger faces are available for rotational entrainment. Due to the larger faces it is possible to provide additional recesses for the rotary entrainment members. To increase the surface area of the entrainment faces of the chucking shank with a four-cornered cross-section, the faces can, in a preferred manner, be shaped convexly or concavely.

To assure economical fabrication of the chucking shank of the present invention, in its initial form the chucking shank is an extruded blank of square or rectangular cross-section, which can be brought into a final shape by massive deformation. In such deformation, the chucking shank is placed in its final form by upsetting and contact pressure.

Tool bits shaped in the manner explained above have the advantage that they can be used in a conventional tool bit chuck, such as disclosed in DE-PS 25 51 125. There is the disadvantage, however, that higher shares of torque cannot be transmitted, since the shaped faces remain idle. The advantage of the present invention, that is the possibility of increasing the transmitted torque, can be obtained if the tool bit is inserted into a tool bit chuck with a receiving bore having a polygon-like cross-section with polygon faces or surfaces wherein at least one of the polygon faces cooperates with the entrainment face of the chucking shank of the tool bit and another face has a through aperture for a radially displaceable locking member which can be placed in engagement with the locking groove in the chucking shank of the tool bit.

To avoid small wall thicknesses in the guidance region of the chuck, the corners of the polygonal faces are preferably chamfered or rounded.

Preferably, at least one polygon face has a strip-shaped entrainment member extending in the axial direction with essentially radially extending matching faces which cooperate with entrainment faces on the shank which extend essentially radially. Through the arrangement of such rotary entrainment members, an improved distribution and an improved transmittal of the torque from the tool bit chuck to the chucking shank of the tool bit is achieved.

The cross-section of the chuck retaining bore is preferably shaped as a four-cornered polygon with polygon faces. The polygon faces are arranged symmetrically to assure a uniform distribution of the torque to the chucking shank of the tool bit.

It is preferable for the faces of the four-cornered polygon to be concave or convex. Such a shape increases the area of the polygon faces whereby the force transmitted from the tool bit chuck to the clamping chuck of the tool bit is distributed over a larger area. This results in smaller surface pressures.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DETAILED DESCRIPTION OF THE INVENTION

An axially extending chucking shank 1, 10 shown in FIGS. 1 to 4 has a basically square cross-section viewed transversely of the axial direction with profiled faces or surfaces of essentially the same size. In the surface of two profiled faces, located diametrically opposite one another, are locking grooves 2, 19 closed at their ends spaced apart in the axial direction. The axially spaced end surfaces of the locking grooves 2, 19 are shaped as part of hollow spheres.

The other profiled faces disposed at 90° relative to the locking grooves 2, 19 form entrainment faces 3, 12 which serve for transmitting torque. The guidance surfaces required for precise centering of the chucking shank 1, 10 in a tool bit chuck, not illustrated, are formed by the chamfered corners 4, 5, 6, 7; 13, 14, 15, 16.

Figure 1:
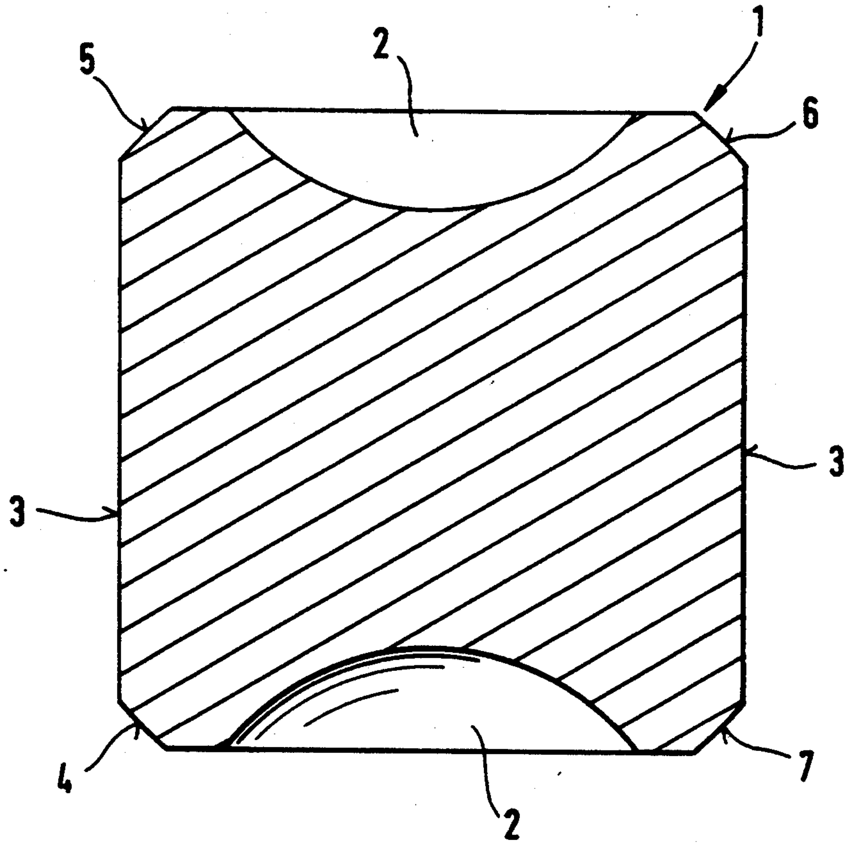
FIGS. 1, 3, 5, 7, 9 and 11 are cross-sections of different examples of a chucking shank embodying the present invention for six different tool bits.
Figure 2:
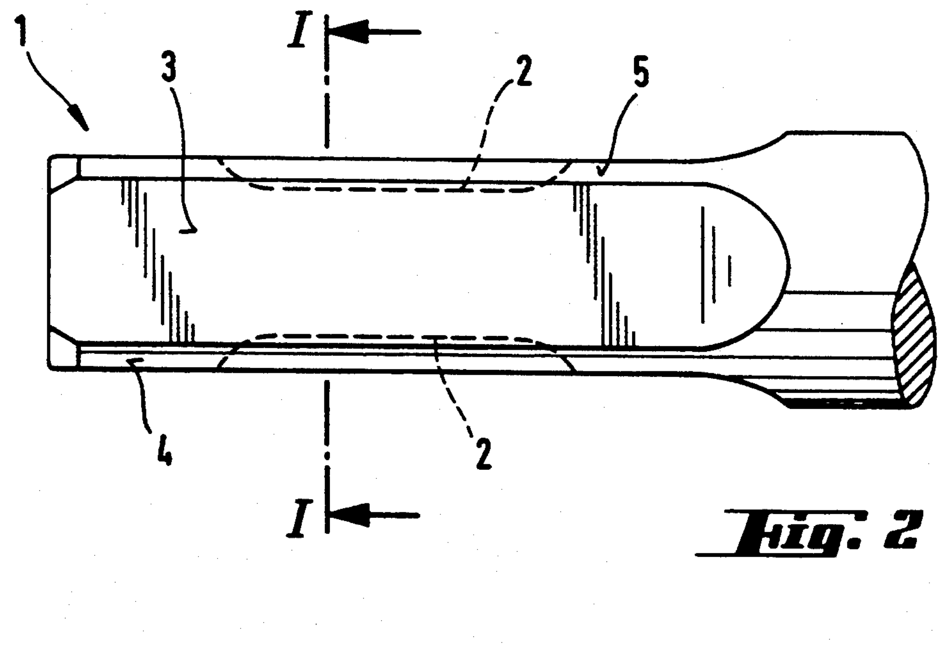
FIGS. 2, 4, 6, 8, 10 and 12 are axially extending side views of the chucking shanks in FIGS. 1, 3, 5, 7, 9 and 11, respectively, illustrated on a reduced scale.
Figure 3:
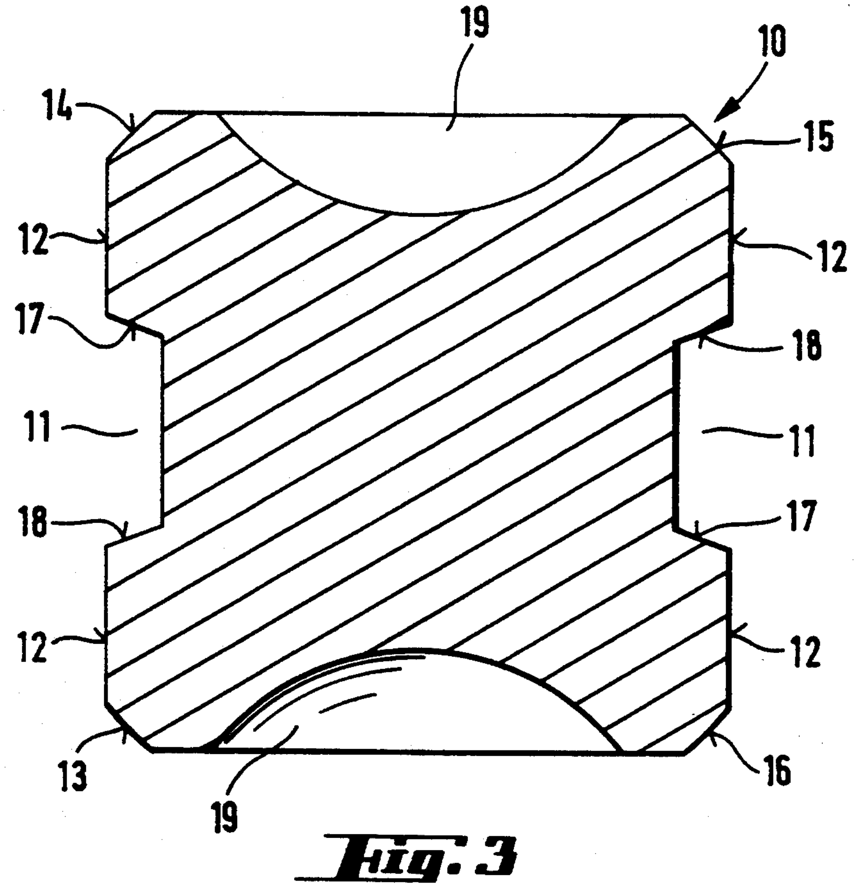
Figure 4:
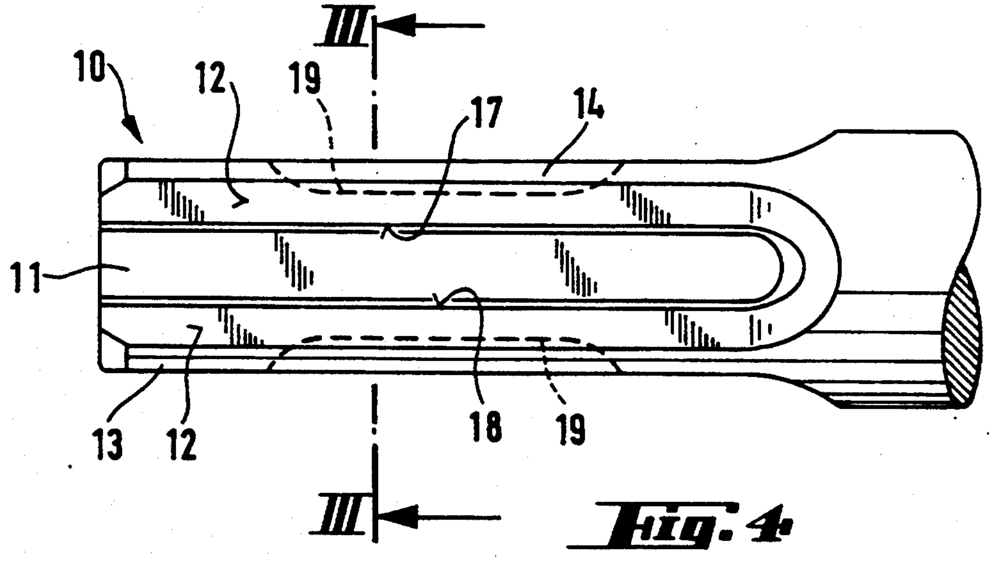

The entrainment faces 12 displayed in FIGS. 3 and 4 have axially extending rotary entrainment grooves 11 open at the free end of the shank 10, that is the left-hand end viewed in FIG. 4. Due to the arrangement of the rotary entrainment grooves 11, additional entrainment faces or flanks 17, 18 are formed extending essentially radially and serving for better transmittal of torque from a tool bit chuck, not shown, to the chucking shank 10.

Figure 5:
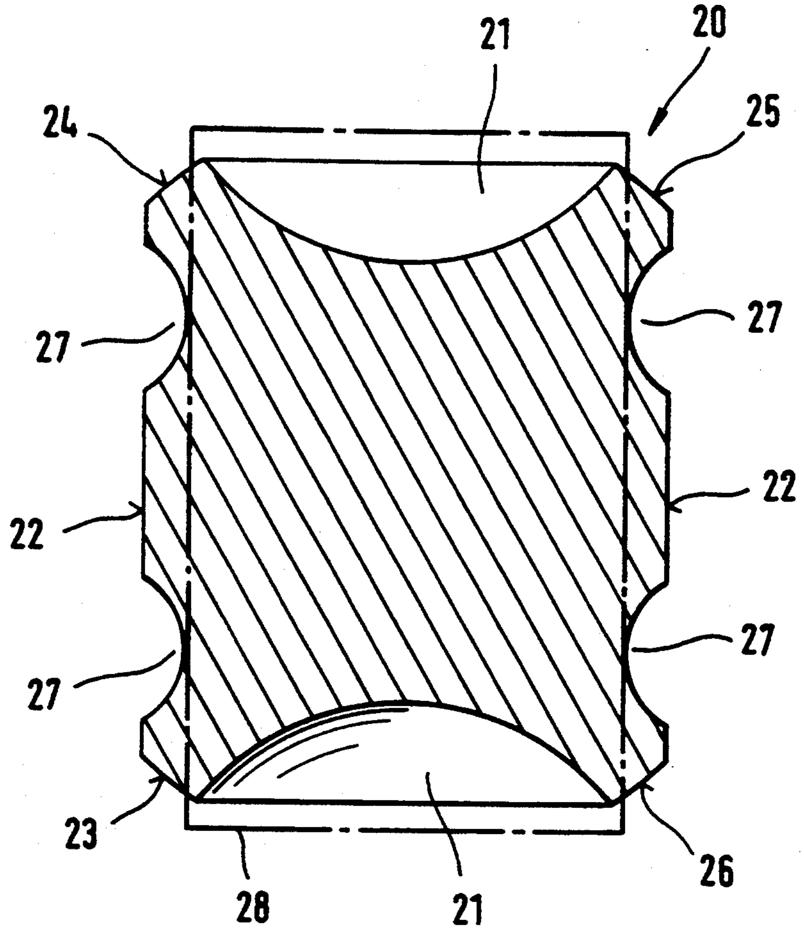
Figure 6:
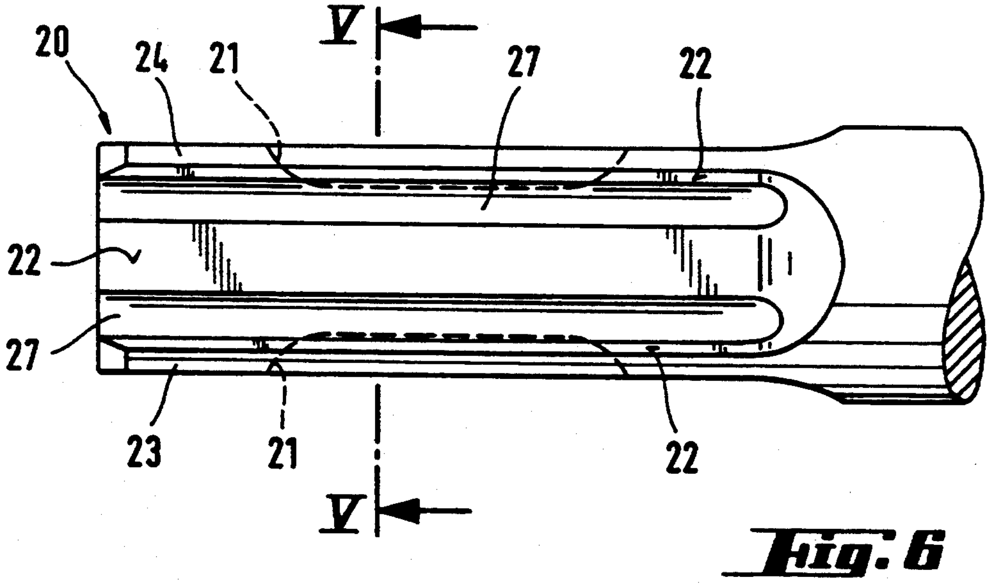

In FIGS. 5 and 6 a chucking shank 20 is shown having a rectangular cross-section. Due to the rectangular cross-section, the profiled faces are formed of different sizes or width. In the surface of the smaller or lesser width profiled faces, locking grooves 21 are formed, closed at their ends spaced apart in the axial direction, note FIG. 6. The axially spaced end surfaces of the locking grooves 21 are shaped as part of a hollow sphere.

A material deformation is performed on the surfaces of the larger or wider profiled faces for shaping the entrainment faces 22. This deformation is provided by pressing two axially extending depressions 27 on two opposite profiled faces 22. The material displaced migrates to the remaining region of the profiled faces so that enlarged entrainment faces 22 are formed.

The broken line displayed in FIG. 5 represents the side surfaces of a four-cornered extrusion blank 28, necessary for forming such a chucking shank 20. By using four-cornered extruded blanks 28 a considerable cost reduction is achieved by saving material. As compared to a round extruded blank, a considerable amount of deforming work is saved by employing a four-cornered extruded blank 28.

To assure that the chucking shank 20 with a rectangular cross-section can be guided in a radially accurate manner within a tool bit chuck, not shown, the corners 23, 24, 25, 26 afford the appropriate guidance contour. Note that the corners are chamfered relative to the sides or faces of the shank.

Figure 7:
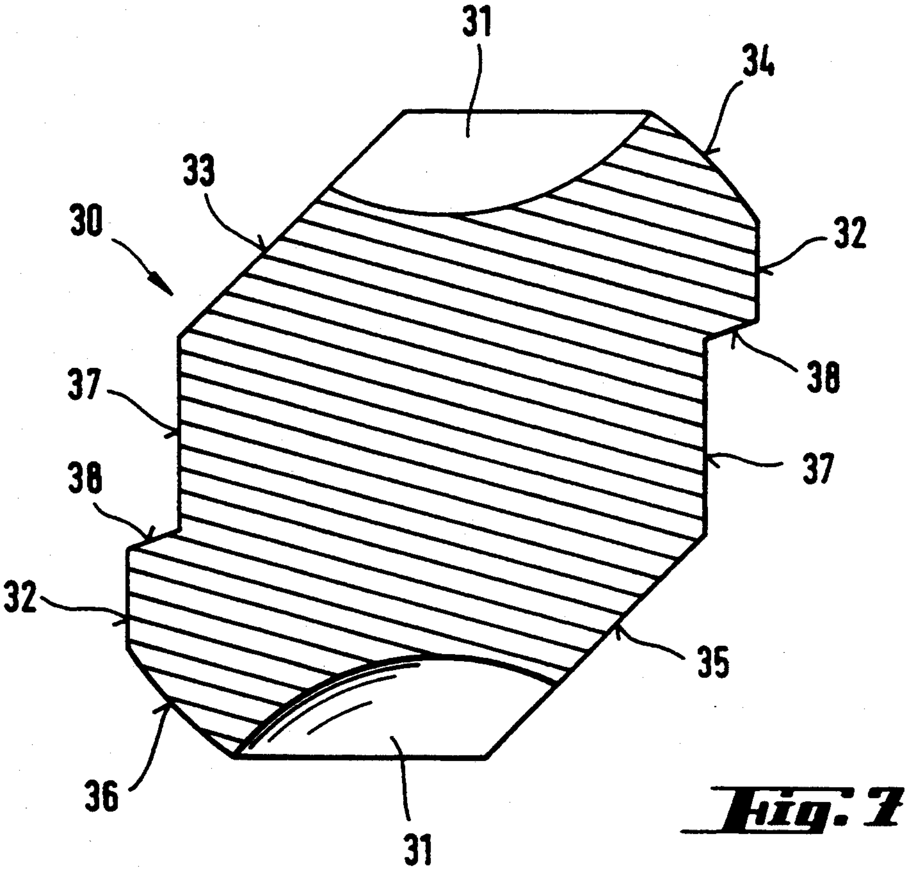
Figure 8:
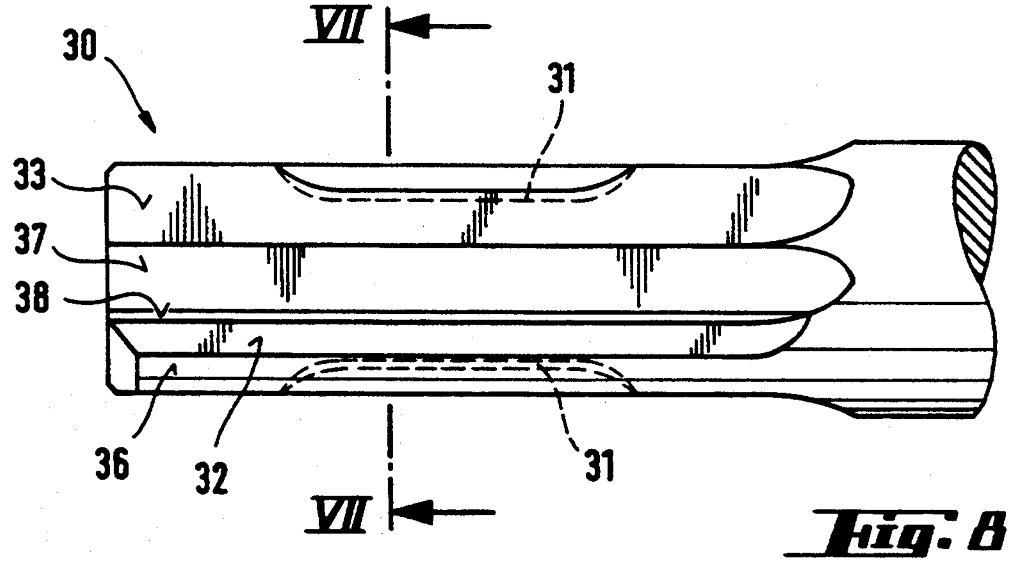

In FIGS. 7 and 8 a chucking shank 30 is illustrated which is formed from a four-cornered polygon where two corners 33, 35 located diametrically opposite one another are beveled or chamfered and the other two corners 34, 36 are rounded-off. The guidance surface required for centrally guiding the tool bit within a tool bit chuck, not shown, is afforded by the two rounded-off corners 34, 36 located diametrically opposite one another. The other two profiled faces located diametrically opposite one another form entrainment faces 32. Each entrainment face 32 has a rotary entrainment groove 37, with the groove 37 extending parallel to one another and serving to center the tool bit. Each entrainment groove 37 has an additional entrainment face or flank 38 extending essentially radially.

Figure 9:
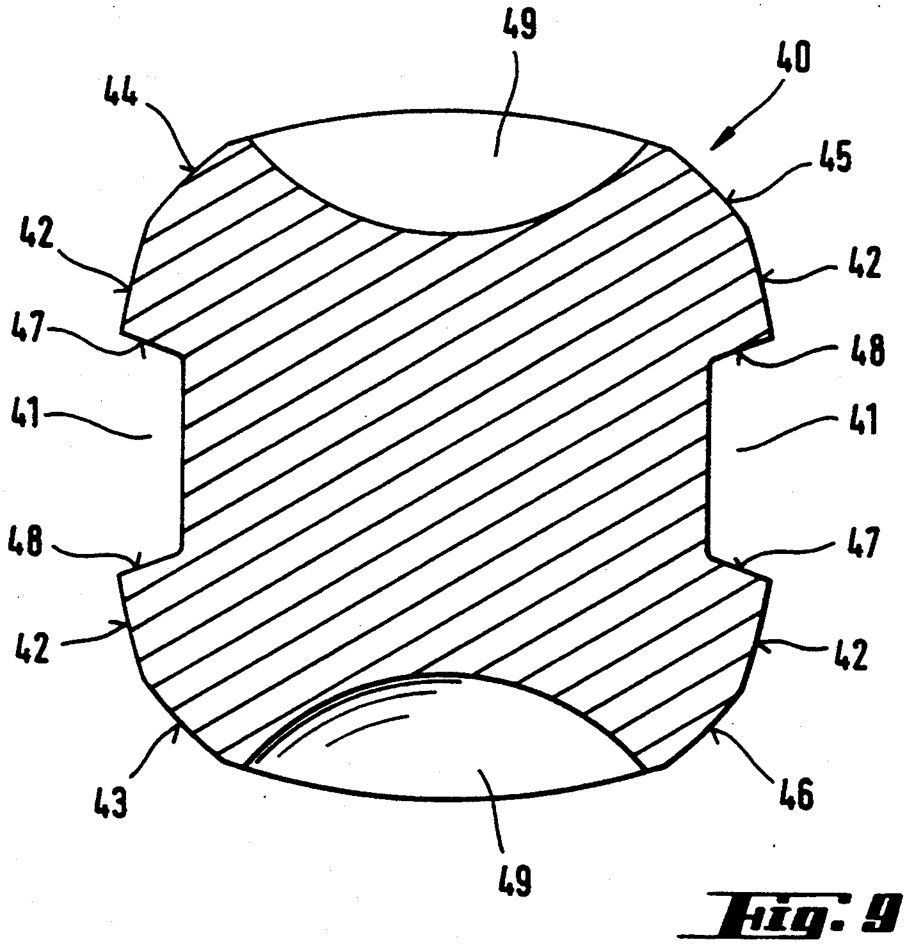
Figure 10:
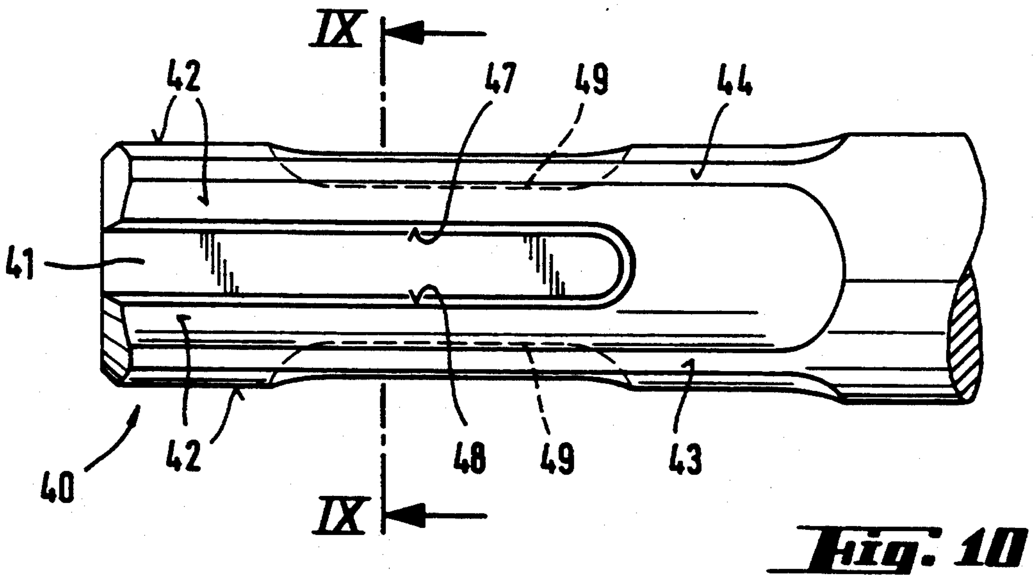

In FIGS. 9 and 10 a chucking shank 40 is shown shaped as a four-cornered polygon. As shown in cross-section in FIG. 9 the shank has convex equi-sized profiled faces. In each of two of the diametrically opposite profiled faces there is a locking groove closed at its ends spaced apart in the axial direction. The axially spaced ends of the locking grooves have the shape of a part of the hollow sphere.

The other two profiled faces, disposed at 90° with respect to the faces containing the profiled grooves 49, form entrainment faces 42 for transmitting torque. Each entrainment face 42 has an axially extending rotary entrainment groove 41 open at the free end of the chucking Shank 40, that is the left hand end as viewed in FIG. 10. By the arrangement of the rotary entrainment grooves 41, additional radially extending entrainment faces 47, 48 are formed affording a better torque transmittal from a tool bit chuck, not shown, to the chucking shank 40.

The guidance contour of the chucking shank 40 is defined by the corners 43, 44, 45, 46 each defined by a pair of axially extending planar surfaces disposed at an angle to one another.

Figure 11:
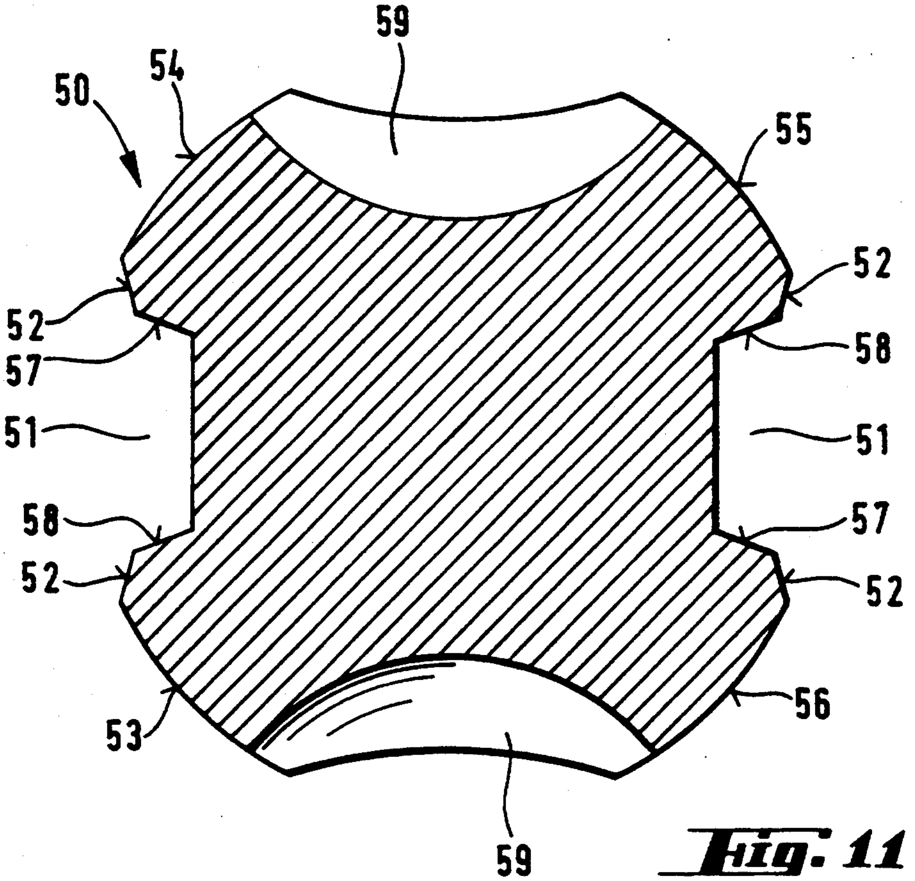
Figure 12:
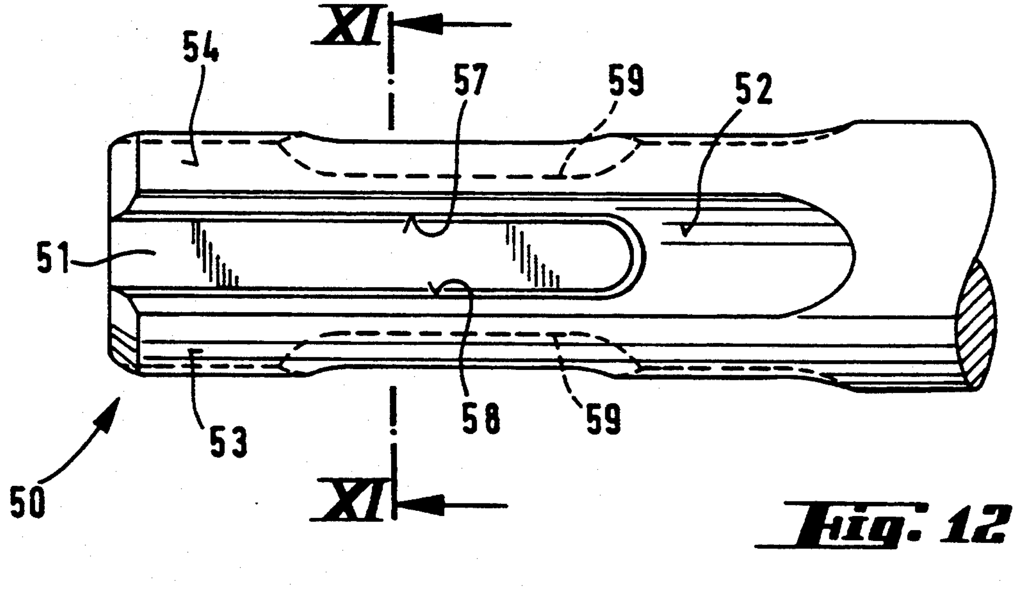

In FIGS. 11 and 12 a clamping shank 50 is displayed having concave profiled faces of basically equal size. Locking grooves 59 are disposed in the surface of two profiled faces located diametrically opposite one another and the grooves have closed ends spaced apart in the axial direction. The axially spaced ends of the locking grooves 59 have the shape of parts of hollow spheres.

In FIG. 11 the profiled faces disposed at 90° with respect to the profiled faces containing the locking grooves, form entrainment faces 52 for transmitting torque. The guidance surfaces required for precise centering of the chucking shank 50 in a tool bit chuck, not shown, is formed by the rounded corners 53, 54, 55, 56.

Each entrainment face 52 has an axially extending rotary entrainment groove 51 open towards the free end of the chucking shank 50, that is, the left-hand end is viewed in FIG. 12. In addition, each rotary entrainment groove 51 has two circumferentially spaced entrainment faces 57, 58 serving for better transmittal of torque from a tool bit chuck, not shown, to the chucking shank 50.

The formation of the tool bit shank where the initial workpiece is an extruded blank which must be deformed, is applicable to the embodiments displayed in FIGS. 1 to 4 and FIGS. 7 to 12, where the original cross-section of the extruded blank can be round, square, rectangular or polygonal.

Figure 13:
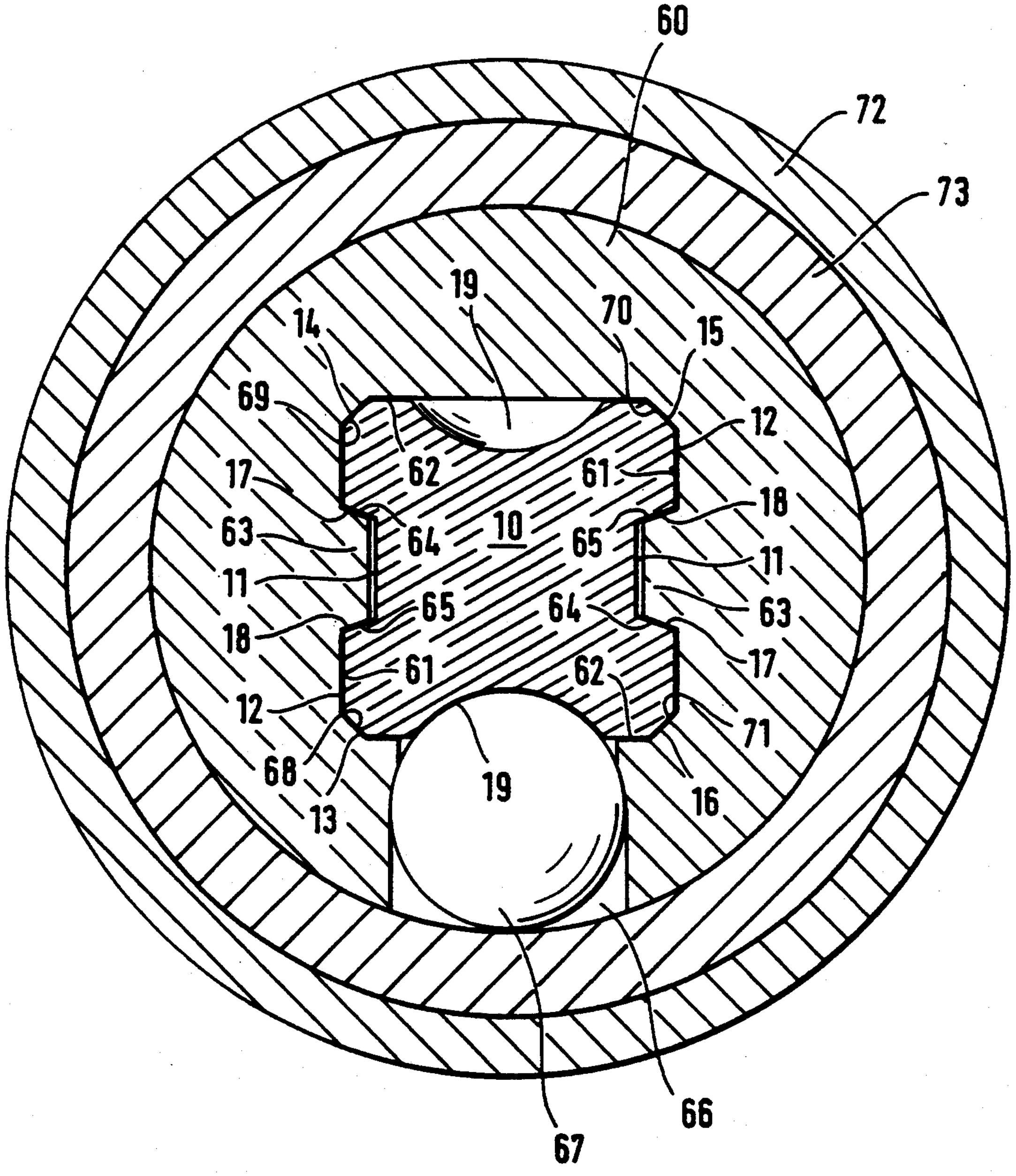
FIG. 13 is a cross-sectional view of a diagrammatically illustrated tool bit shank holding a chucking shank of the type displayed in FIGS. 3 and 4.

In FIG. 13 a tool bit chuck is shown diagrammatically and the chucking shank 10 of the tool bit shown in FIGS. 3 and 4 is positioned in the chuck. The tool bit chuck includes a guide member 60 with a receiving bore, an actuating sleeve 7 enclosing and in surface contact with the guide member 60 and a cage 72 encircling and in contact with the actuating sleeve 73. By displacing the actuating sleeve 73 either axially or in the circumferential direction, a recess, not shown, can be brought into alignment with the locking member 67, so that the locking member 67, guided in a through opening 66, can be displaced radially outwardly. Accordingly, the locking member 67 can move radially outwardly out of the locking groove providing the release of the chucking shank 10, whereby the tool bit can be removed from the guide member 60 and out of the tool bit chuck.

The receiving cross-section of the guide member 60 has a polygon shape and is formed of polygon faces 61, 62 of equal size. The corners 68, 69, 70, 71 joining the polygon faces 61, 62 are beveled or chambered relative to the polygon faces.

In the polygon faces 61 the guide member 60 has two strip-shaped rotary entrainment members 63 projecting radially inwardly and having radially extending matching faces or flanks 64, 65. The rotary entrainment members 63 extend inwardly into the rotary entrainment grooves 11 with the flanks 64, 65 bearing against the flanks 17, 18 in the chucking shank.

While specific embodiments of the invention have been shown and described in detail to illustrate the inventive principles, it will be understood that the invention may be embodied otherwise without departing from such principles.

We claim:

1. A tool bit to be inserted into a tool bit chuck of a hand-held tool for at least one of the chiseling, drilling and percussion drilling, comprising an axially extending chucking shank (1, 10, 20, 30, 40, 50) having an axially and circumferentially extending outside surface and a free end extending transversely of said chucking shank axis, at least one axially extending locking groove (2, 19, 21, 31, 49, 59) and at least one axially extending entrainment face (3, 12, 17, 18, 22, 32, 38, 42, 47, 48, 52, 57, 58) formed in said outside surface, said locking groove being closed at axially spaced ends thereof, said entrainment face (3, 12, 17, 18, 22, 32, 37, 38, 42, 47, 48, 52, 57, 58) having an entrainment surface extending in the axial direction to the free end of said shank, said outside surface deviating from circularity in the circumferential direction, said chucking shank (1, 10, 20, 30, 40, 50) having a polygonally-shaped cross-section transverse of the axis thereof and having axially and circumferentially extending faces and corner surfaces (4, 5, 6, 7, 13, 14, 15, 16, 23, 24, 25, 26, 34, 36, 43, 44, 45, 46, 53, 54, 55, 56) joining and extending transversely of said faces, at least two said corner surfaces (4, 5, 6, 7, 13, 14, 15, 16, 23, 24, 25, 26, 34, 36, 43, 44, 45, 46, 53, 54, 55, 56) form guide surfaces for guiding said chucking shank in a tool bit chuck, and said at least one entrainment face (3, 12, 17, 18, 22, 32, 37, 38, 42, 47, 48, 52, 57, 58) located in one of said faces of said polygonally-shaped cross-section.

2. A tool bit, as set forth in claim 1, wherein said corner surfaces comprise two diametrically opposite corner surfaces (4, 6; 5, 7; 13, 15; 14, 16; 23, 25; 24, 26; 34, 36; 43, 45; 44, 46; 53, 55; 54, 56).

3. A tool bit, as set forth in claim 1 or 2, wherein said corner surfaces comprise four corners (4, 5, 6, 7; 13, 14, 15, 16; 23, 24, 25, 26; 43, 44, 45, 46; 53, 54, 55, 56) wherein each two of said corners (4, 6; 5, 7; 13, 15; 14, 16; 23, 25; 24, 26; 34, 36; 43, 45; 44, 46; 53, 55; 54, 56) are disposed diametrically opposite one another.

4. A tool bit, as set forth in claim 1 or 2, wherein at least two said entrainment faces (3, 12, 17, 18, 22, 32, 38, 42, 47, 48, 52, 57, 58) are formed in said polygonally-shaped cross-section.

5. A tool bit, as set forth in claim 1 or 2, wherein at least a part of said entrainment faces (17, 18, 38, 47, 48, 57, 58) have an axially extending entrainment groove (11, 37, 41, 51) extending axially and open at the free end of said chucking shank (10, 30, 40, 50) and said entrainment grooves have axially and radially extending entrainment faces (17, 18, 38, 47, 48, 57, 58).

6. A tool bit, as set forth in claim 1 or 2, wherein said polygonally-shaped cross-section is a four-cornered polygon.

7. A tool bit, as set forth in claim 6, wherein said faces of said polygonally-shaped cross-section are convex.

8. A tool bit, as set forth in claim 6, wherein said faces of said polygonally-shaped cross-section are concave.

9. A tool bit chuck with a receiving bore for the chucking shank of said tool bit, as set forth in claims 1 or 2, wherein said receiving bore extends axially and has a polygonally-shaped cross-section transverse of the axial direction and has polygon faces (61, 62) wherein at least one of said polygon faces (61) cooperates with one of said entrainment faces (12) on said chucking shank (10) of said tool bit and wherein another said polygon face (62) comprises a through opening (66) for a radially displaceable locking member (67) radially displaceable between said locking groove (19) in said clamping shank (10) and a position spaced radially outwardly from said locking groove (19).

10. A tool bit receptacle, as set forth in claim 9, wherein said receiving bore has corners (68, 69, 70, 71) extending between and joining said polygon faces (61, 62) and said corners extend transversely of said polygon faces.

11. A tool bit receptacle, as set forth in claim 9, wherein at least one said polygon face (61) includes an axially extending strip-shaped rotary entrainment member (63) with laterally spaced radially extending matching faces (64, 65) arranged to cooperate with similarly radially extending said entrainment faces (17, 18) of said chucking shank (10).

12. A tool bit chuck, as set forth in claim 9, wherein said receiving bore is shaped as a four-cornered polygon.

13. A tool bit chuck, as set forth in claim 12, wherein said polygon faces (61, 62) of said four-cornered polygon are concave.

14. A tool bit chuck, as set forth in claim 12, wherein said polygon faces (61, 62) of said four-cornered polygon are convex.

* * * * *